United States Patent [11] 3,607,213

[72] Inventors Schroeder Jerzy
 Wroclaw;
 Zielinski Stefan, Wroclaw; Dziadur Janusz, Kwaczala; Luty Stanislaw, Kwaczala; Czunko Adam, Chrzanow; Synowiec Jerzy, Gliwice, all of, Poland
[21] Appl. No. 771,606
[22] Filed Oct. 29, 1968
[45] Patented Sept. 21, 1971
[73] Assignee Zaklady Chemiczne
 Alwernia, Poland
[32] Priority Nov. 2, 1967
[33] Poland
[31] P123361

[54] PROCESS OF PRODUCING CONCENTRATED POTASSIUM-CALCIUM PHOSPHATIC FERTILIZER
 1 Claim, No Drawings
[52] U.S. Cl. ................................................ 71/33,
 23/107, 23/108, 71/34, 71/41, 71/43
[51] Int. Cl. ........................................... C05b 11/10,
 C05b 7/00

[50] Field of Search ............................................ 71/33, 34, 41, 43; 23/107, 108

[56] References Cited
UNITED STATES PATENTS

| | | | |
|---|---|---|---|
| Re.25,455 | 10/1963 | Lobdell | 71/34 X |
| 2,036,760 | 4/1936 | Knox | 71/41 X |
| 2,067,538 | 1/1937 | MacIntire | 71/41 X |
| 2,173,826 | 9/1939 | Curtis | 23/108 |
| 2,288,418 | 6/1942 | Partridge | 71/34 X |
| 2,874,027 | 2/1959 | Gloss | 23/107 |

Primary Examiner—Reuben Friedman
Assistant Examiner—Bennett H. Levenson
Attorney—Irvin A. Lavine ABSTRACT: Process of producing potassiumphosphatic fertilizer comprising reacting potassium chloride with phosphoric acid in amount of about 35–55 percent by weight of excess over a stoichiometric amount at 120°–350° C. and neutralizing the excess phosphoric acid with calcium oxide at the same temperature. The neutralization product is melted at 750°–1000° C. and fast cooled to ambient temperature. The fertilizer obtained is fully water-soluble and nonhygroscopic.

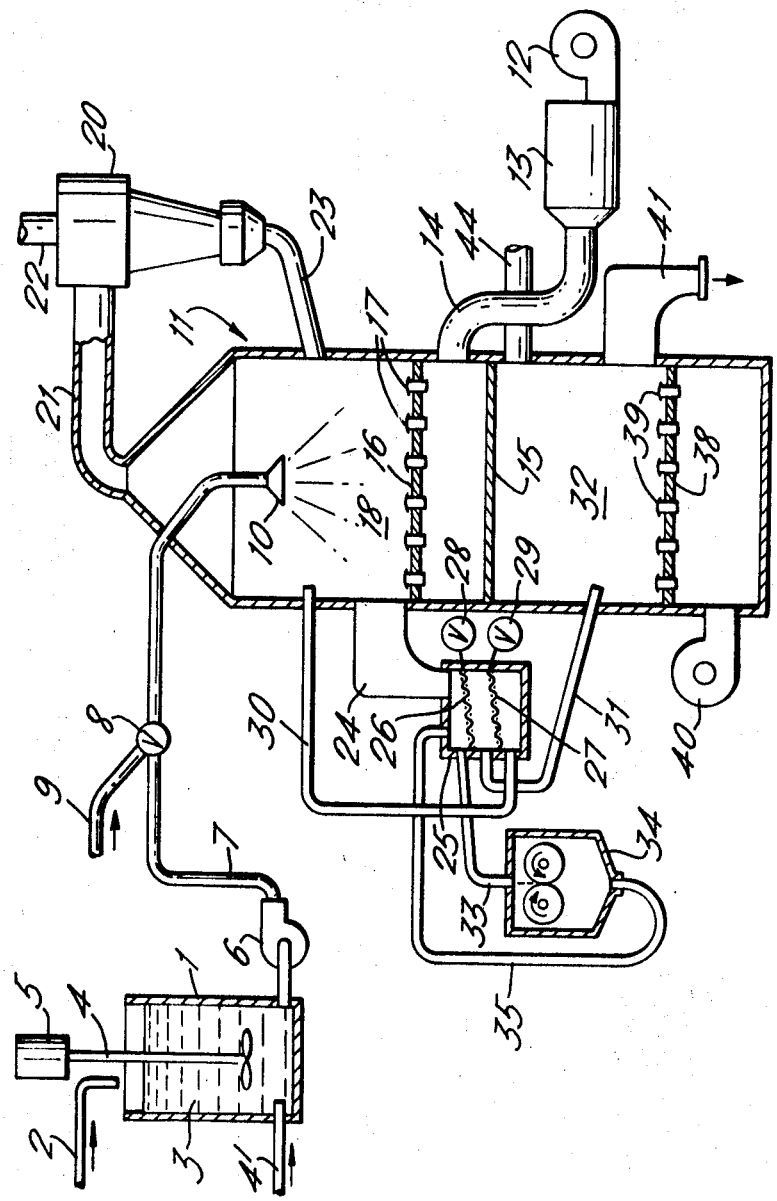

FLUID BED PROCESSING

BACKGROUND OF THE INVENTION

In conventional processes to form phosphate fertilizers, phosphate rock is treated with sulfuric acid to produce phosphoric acid. This acid may be reacted with ammonia gas to form diammonium phosphate which must be separated, dried in a rotary kiln, and ground to a desired granule size. Phosphoric acid may also be used to treat ground phosphate rock to produce triple superphosphate which is also usually dried in a rotary kiln and ground to a desired granule size.

SUMMARY OF THE INVENTION

Phosphoric acid reacts with ammonia gas or with ground phosphate rock and is sprayed into a fluid bed dryer where granules are formed, build to a desired size, dried, and separated to form a product in one operation. The process of this invention does away with the need for a rotary kiln and a large-scale pulverizer. The pellet shape produced by the process of this invention is superior to that produced by conventional rotary or "saucer"-type granulators. In addition, in the production of diammonium phosphate, the greater precision of temperature control makes possible a reduced nitrogen loss in the product compared with a conventionally produced product. In all cases, less recirculation of the materials is required as granulation is better controlled with the fluid bed spray technique. Finally, since this process does not require the rotary kilns and the granulation of the dried product, and since some reaction equipment may not be required, plant investment and the size of a given facility is greatly reduced.

BRIEF DESCRIPTION OF THE DRAWING

The FIGURE of the drawing is a vertical section through a fluid bed dryer and associated equipment according to this invention.

DESCRIPTION OF THE PREFERRED EMBODIMENTS

Referring to the drawing in detail, for the production of diammonium phosphate, phosphoric acid, $H_3PO_4$, is pumped to a stainless steel mixing and reacting tank 1 from a pipe 2. Ammonia gas is introduced into the acid 3 in tank 1 from a pipe 4' to be agitated by agitator 4 driven by motor 5. This addition of ammonia gas is controlled to produce the monoform or $NH_4H_2PO_4$. The monoform is pumped by pump 6 through pipe 7 as a slurry to a mixing valve 8 where more ammonia gas is added through pipe 9 and final ammoniation to the diform or $(NH_4)_2HPO_4$ takes place. The mol ratios in these ammoniation stages must be controlled (1.25 mols ammonia gas to 2.0 mols $H_3PO_4$) to produce a slurry with the proper fluidity for handling, spraying and producing granules of a proper size, form, and density.

This slurry is sprayed from nozzle 10 into the fluid bed dryer 11. Air from blower 12 is heated by a gas air heater 13 or the like and introduced through duct 14 into the bottom of drying chamber 18 above partition 15 and below partition 16 which contains the air passage nozzles 17. Air from nozzles 17 rises in chamber 18 to fluidize or support and dry sprayed particles of diammonium phosphate which aggregate fresh spray and grow therein. Hot air rising upward enters collector 20 through duct 21 from which air vents upward in duct 22 and collected fine granules of diammonium phosphate are returned to the fluidized bed through duct 23. The spray of slurry from the nozzle 10 builds the fine returned granules to a larger size.

Larger granules sink downward to be discharged through a discharge hopper 24 at a rate equivalent to the solids concentration of the feed slurry after a retention period sufficiently long to produce dry granules at the selected and controlled bed temperature. Hopper 24 discharges onto a two deck vibrating screen unit 25 containing coarse screen 26, fine screen 27, and their vibrators 28 and 29. Fines passing through both screens are returned through pipe 30 to the fluidized bed for further growth. Large granules which do not pass through screen 26 enter pipe 33 to pass through grinder 34 and be pulverized therein and be returned for recycle through pipe 35 to the screen unit 25. Product granules, which pass through screen 26 and do not pass through screen 27, pass through pipe 31 to the cooling chamber 32. Thus it may be seen that the screen unit 25 controls the limits of the desired product granules.

Cooling chamber 32 has a fluidizing bed plate 38 containing nozzles 39 which pass cool air from blower 40 upward to fluidize and cool the product granules which are withdrawn through discharge hopper 41 for bagging. Air from cooling chamber 32 leaves through duct 44 which may have a collector (not shown) attached thereto and pass exhausted air, now heated in cooling the product granules, to the intake of blower 12.

Diammonium phosphate granules produced according to this invention are of a superior and more uniform formulation as they are produced from the spraying of a slurry. Fluid bed dryer 18 is held between 180° and 220° F. (82° C. and 104° C.) for the best drying of the granules therein. The product granules are cooled in chamber 32 to 120° F. (0° C. to 49° C.) which is a safe level for bagging.

Triple superphosphate is produced according to this invention in substantially the same manner as has been described. Normal 54 percent phosphoric acid is diluted to 40 percent strength and maintained at a temperature of 200° to 230° F. (93° C. to 110° C.). This heated acid is added to tank 1 through pipe 2 while fine ground phosphate rock is added to the tank at a rate of 0.515 pounds of the rock for each pound of the diluted acid. Agitator 4 forms a slurry which is pumped to the fluid bed dryer 11 through pipe 7 by pump 6. Mixing valve 8 and pipe 9 are not required as no further material is added. This slurry is sprayed from nozzle 10 onto the fluidized bed. The fluidized bed in chamber 18 will have triple superphosphate granules fluidized in it so that the spray from nozzle 10 continuously forms and builds granules or pellets of triple superphosphate to a desired size.

Triple superphosphate is removed as a product with following steps which are substantially similar to those described above for diammonium phosphate.

Other phosphates and fertilizers may be produced with a more uniform composition, as they are formed from a slurry, in the process of this invention. The granules, which are formed from a spray in a fluid bed, are more regular in shape and may be better classified as to size using the apparatus of this invention.

While this invention has been shown and described in the best forms known, it will nevertheless be understood that this is purely exemplary and that modifications may be made without departing from the spirit and scope of the invention except as it may be more limited in the appended claims.

I claim:

1. The process for the production of a high analysis phosphate fertilizer material comprising the steps of:
    a. forming a hot liquid slurry of the fertilizer material between about 93° to 110° C.,
    b. spraying the hot liquid slurry into rising heated air between 82° C. and 104° C. to form, build, and dry granules in a fluidized bed,
    c. withdrawing air from above the fluidized bed and separating fine granules therefrom,
    d. returning the fine granules to the fluidized bed for further building therein, and
    e. withdrawing granules from the bottom of the fluidized bed, separating said granules into large, medium and small size granules and cooling said medium size granules to between 0° C. and 49° C.

2. The process according to claim 1 with the additional steps of:
    f. sorting the product granules into fines, a desired product size range, and large granules, g. returning fines so sorted to the fluidized bed for further growth, and h. pulverizing the large granules.

3. The process according to claim 2 wherein the pulverized large granules are recycled into step (f) above.

4. The process according to claim 2 with the additional steps of:

i. passing the granules of a desired product size range onto a fluidized bed of cooling air, and j. removing the cooled granules of the desired product size range.

5. The process according to claim 4 wherein the cooled granules are removed at a temperature below 49° C.

6. The process according to claim 2 wherein the liquid slurry is formed by the ammoniation of phosphoric acid with ammonia gas in successive stages to the mono- and then to the di- form, product granules being of diammonium phosphate.

7. The process according to claim 2 wherein the liquid slurry is formed by introducing fine ground phosphate rock into 40 percent phosphoric acid at a temperature between 93° C. and 110° C.